Figure 1:
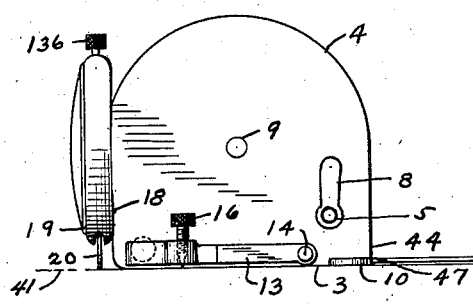

Feb. 15, 1938.    C. L. CLARK    2,108,251
CURVILINEAR MEASURING INSTRUMENT

Filed Sept. 28, 1936

Inventor
CUYLER L. CLARK.

By Howard J. Whelan.
Attorney

Patented Feb. 15, 1938

2,108,251

UNITED STATES PATENT OFFICE 2,108,251

CURVILINEAR MEASURING INSTRUMENT

Cuyler L. Clark, Baltimore, Md.

Application September 28, 1936, Serial No. 102,853

3 Claims. (Cl. 33—141)

This invention refers to improvements in measuring instruments and particularly to those used for graphically measuring arcs and circles and determining the trigonometric functions of same.

It has among its objects, to provide an instrument of this type capable of accurately measuring arcs on maps and drawings; to provide for adjustment of the measuring arrangement and to improve the operation of the device; to have the instrument designed to adapt itself to the variable conditions met in practice and to make it more conveniently usable, all in the self-contained construction of the device. Other objects will become apparent as the invention is more fully set forth.

This invention provides a graphical-measuring instrument that may be attached to a drawing or map conveniently, preferably by the simple pressing of a pin into the drawing or map, establishing a definite position of the initial point of the device thereon and then making recorded measurements. It consists of a steel tape construction having a number of holes within the tape which register with another locking pin arranged to secure the case of the tape to the drawing also. A unique micrometrical adjustment is also provided. A suitable rotameter is attached to and provided for the physical measuring and recording by the device.

Figure 2:
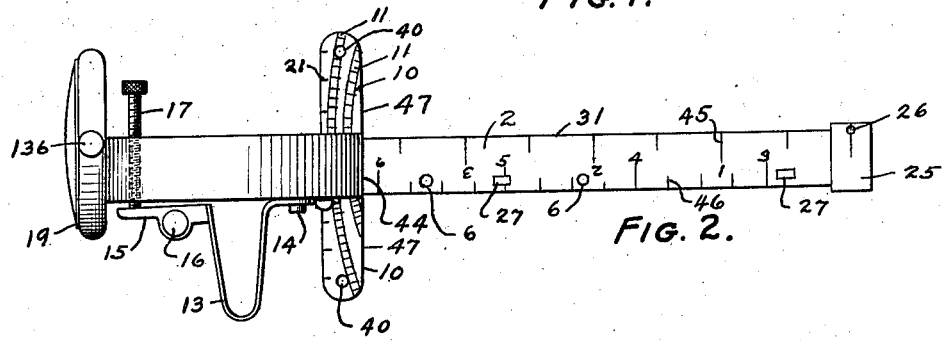
Figure 3:
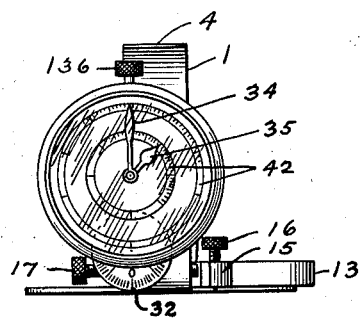
Figure 4:
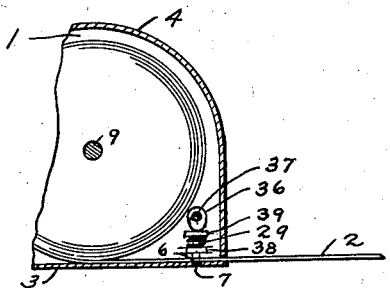
Figure 5:
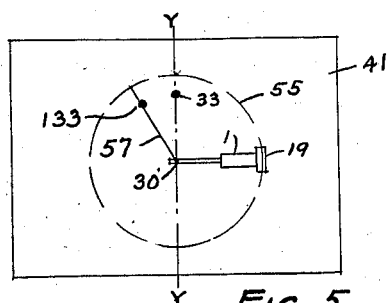

In the drawing which illustrates by way of example an embodiment of this invention:

Figure 1 is a side elevation of a modification of a curvilinear measuring instrument embodying this invention, Figure 2 is a plan view of Figure 1, Figure 3 is an end elevation of the device looking at the rotameter end of Figure 1, Figure 4 is a detail section of the measuring tape casing and fastening device therein, and Figure 5 shows the device as applied to a map or drawing, chart, etc. to illustrate a use of the same.

Similar reference characters refer to similar parts throughout the drawing.

In the construction indicated in the drawing 1 represents a case for containing a conventional measuring steel tape 2, and spring for operating the same. This case is preferably made as shown with one side 3 flat and straight for enabling the measuring tape to be used with its flat sides uppermost by itself without any additional support. This forms a stabilized construction. Its upper portion 4 is preferably circular as shown. The case is arranged with a fastener 5, adapted to frictionally lock the case and tape together at any desired length, and to mechanically lock the case and tape together at predetermined positions when the pin 7 enters the hole 6 in the tape. The fastener 5, consists of pin 7, spring 29, pin head 39, cam 36, shaft 37, bracket 38 attached to case 4, which guides the pin 7, and handle 8.

The handle 8 on the exterior side of the case enables the fastener 5 to be operated conveniently. The design of the case enables the fastener to be installed readily in the location marked. The shaft 9 is for mounting the spring and the measuring tape and providing a means for winding same on.

The case has arms 10 built onto its side to extend from the sides on either side and additionally reinforce the stability of the device when placed on a drawing or map. The arms have degree markings 11 to suit the use of the device. In the outlines, angle degrees are indicated and in different sets, so that various values can be obtained at a glance and provide for that rapidity of use that occasion or circumstances may make desirable. For instance, the degrees may be marked to suit several radial settings of the instrument, so that at the respective settings the value may be read on the arms immediately. As an example, let it be assumed that the casing 4 is brought to position on the tape shown in the drawing, and that the angles indicated by the degree arc 11 give the angle values from the hole 26 as a center. This arc then is set for the casing placed on the tape as shown. If the casing is moved up the tape until its edge 44 is closer to the hole 26, as for instance at scale marks 5, then the angle arc would belong to a smaller circle, and such is shown at 10 and other angle arcs could be provided similarly to suit the position of the casing in regard to its distance from the hole 26. Other markings of the same type may be used and to cover their use, the additional degree marks 21 are drawn on the arms 10 to indicate same. At the side of the case, a V-shaped spring member 13 is attached at one end 14, and a leg 15 extending along the side has a map holding screw 16 in it, to enable this spring member to be secured to the map or board on which it is used. This member forms the basis for a micrometer adjustment of the case, in a manner to be explained later. A micrometer screw 17 contacts the leg 15 so as to operate the case backwards and forwards, when the screw or pin 16 is in the stationary map or board. The front 18 of the case is designed to receive a rotameter 19 to bring the measuring wheel 20 preferably at right angles to the plane of the measuring tape, and aligned with the center pin 22 which serves as the stationary center on which the instrument is rotated, when used. The center pin 22 is of the replaceable type and is mounted in a holder 23 which in turn is attached on a spring 24 provided adjacent the end of the measuring tape. This spring is formed to permit the center pin 22 to be readily inserted or taken out of a hole 26 in the end portion of the measuring tape end plate 25 as shown in the drawing. The pin will rest normally on the upper surface of the tape when pulled out of the hole 26. In order to accurately sight any position that the measuring tape may take with respect to the establishment of the pin 22 in the hole 26, a series of holes 27 are provided in the measuring tape to enable an alidade to be set accurately with respect to the line of this device. The hole 26 is disposed in the end plate 25 in alignment with the straight edge 31, which also is aligned with the contact point 32 of the rotameter. This line is the base line of the instrument and all measurements are founded in relation to it, including the markings 11, on the arms 10. Holes 40 in the arms 10 serve the dual purpose of being usable for thumb tack fastening or pencilling marks. The markings 46 on the tape designate the measurements from the center point 22 to the contact point of the rotameter measuring wheel 20 and is read directly at the back edge 44 of the case. The markings 45 on the tape designate the actual measurements from the center point 22 to the back edge 44 and along the edge 47 of the case arms 10.

The operation of the instrument is as follows: The measuring tape is drawn out and the pin 7 set in the second hole 6 of the tape which is beyond the point 33 to be plotted on map 41. The center pin 22 is inserted through the hole 26 and into a point 30 selected on the map, drawing, chart, or board 41. The rotameter is moved along the circle 55 from the map base line Y—Y until the rotameter gives a reading of say, 60 degrees. A line 57 is then plotted on the map and at a point ten inches from the center point 30 taken on scale 45, a plotting point 133 is established or marked on map. The angle between the points 33 and 133 measured on the 10 inch center will be one-half the rotameter reading taken with the instrument set in the second hole 6 or on a 20 inch radius. The rotameter gives a recorded reading with its hands 34 and 35 and reading lines 42 and the user notes same. The knurled wheel 136 on the rotameter serves to release or reset the hands to zero and the slots 27 serve to provide a fastening when the alidade is used. The markings on the measuring tape are not necessarily feet or inches, but may be set for certain arbitrary amounts which designate the measurements desirable in its use. The positioning of the case with respect to the amount of tape pulled out of it and locked in one of the holes 6 serves to establish the ratio on which the radius used is based. In another example, for instance, with the amount of tape released being ten, read on scale 46 and pin 7 being placed in the first hole 6, the movement of the rotameter and its recorded measurements will be based on the results that ten gives in a suitable table made up in regard to same. Assuming that the ratio is ten (10) and that the rotameter gives a reading of 5.236 and the table establishes the fact that this reading gives a trigonometric angle of thirty degrees (30°), then the angle between the base line and that of the established line is thirty degrees (30°) and the user establishes this information and any other that his needs or desires require.

The rotameter may be graduated to read directly in degrees and/or proportions thereof, or any other method of angular measurement.

When the rotameter is graduated to give a direct reading of degrees, minutes, etc. on a ten inch diameter circle and it is desired to use the same graduations for angular measurement of a twenty inch diameter circle, the same may be obtained by dividing the reading by 2. For a thirty inch diameter circle divide by 3, etc.

When the tape is set and fastened on its center pin 22, with the tape flat as its construction permits, on the map surface, the case is locked on the tape at the distance selected. The radius is the straight edge 31 with 22 as a center and the rotameter wheel 20 as a point on the circumference of curvilinear line to be measured. The case is swung on this radius, the bottom of the case and the arms 10 keeping the instrument flat on the plane of the map while being rotated.

The specific angular degree markings 11 on the arms 10 serve to eliminate unnecessary repetition of measuring processes in certain cases and to check up the results given and enable the user to avoid clerical errors in figures that might arise from a misunderstanding of the numbers and values to be used in a problem.

The purpose of this instrument is to provide a new field for partially-graphical reading combined with calculated mathematics in order to save time, effort, and make the results clearer and more practical. While it may be shown in only one form in the drawing, it is not desired to limit this application for patent to this particular form, or in any other way, otherwise than limited by the prior art, as it is appreciated that other types of construction could be designed that would use the same principles and come within the scope of the appended claims.

Having thus described my invention, I claim:

1. A chart measuring instrument of the class described comprising in combination, a flat measuring tape having a plurality of measuring markings at one edge thereof, said edge consisting of a marking guide and setting holes adjacent the opposite edge, said holes being spaced in predetermined positions along the edge, an end plate on the tape with a center hole therein aligned with said marking edge, a center pin resiliently attached to the plate and freely moveable in and out of said center hole, said pin when inserted in the hole and chart surface providing a center of movement for the tape to radially position therewith and circumferentially move therearound, a case for resiliently and extensibly holding the tape and having a flattened peripheral portion adapted to rest flat on a chart and direct the extensible movement of the tape parallel thereto, a cam point mounted on the case arranged to lock in the holes in the said tape and hold the case and tape in predetermined relation with one another and to give a predetermined setting, arms on the case to keep same upright, a rotameter having a chart contacting wheel mounted on the case opposite to the egress position of the tape, and facing away from the case, said rotameter wheel center being aligned with the marking edge of the tape, and means for operating the cam point.

2. A chart measuring instrument of the class described comprising in combination, a flat measuring tape having a plurality of measuring markings at one edge thereof, said edge consisting of a marking guide and setting holes adjacent the opposite edge, said holes being spaced in predetermined positions along the edge, an end plate on the tape with a center hole therein aligned with said marking edge, a center pin resiliently attached to the plate and freely moveable in and out of said center hole, said pin when inserted in the hole and chart surface providing a center of movement for the tape to radially position therewith and circumferentially move therearound, a case for resiliently and extensibly holding the tape and having a flattened peripheral portion adapted to rest flat on a chart and direct the extensible movement of the tape parallel thereto, a cam point mounted on the case arranged to lock in the holes in the said tape and hold the case and tape in predetermined relation with one another and to give a predetermined setting, arms on the case to keep same upright, a rotameter having a chart contacting wheel mounted on the case opposite to the egress position of the tape, and facing away from the case, said rotameter wheel center being aligned with the marking edge of the tape, and means for operating the cam point, an adjustment device for vernierly adjusting the measuring tape having a surface contacting face, comprising a surface attachment, a resilient member pivoted on said attachment, a plurality of arms on the member, and extending along the side of the case, a screw attached to and projecting from the case, and adapted to make connection with one of said arms and act on same to adjustably position the said tape with regard to the said surface attachment.

3. A measuring instrument of the class described comprising in combination, a measuring tape having a plurality of markings thereon, a case for the storage of the said tape and adapted to be rigidly held at right angles to the face of the tape extended therefrom, a center pin for securing the tape to a surface and providing a center of movement for the tape and case to circumferentially move around, internal means in the case for rigidly locking the tape and case together and thereby make a quasi-integral construction thereof, a rotameter attached to the case opposite the said tape and held in definite rigid relation to the face of the said tape and adapted to operate with the tape and case about the said center of movement thereof and proportionately therewith, and register the arcuate movement moved thereof, a plurality of arms stabilizing the case, said arms being mounted on the sides of the case and positioned in predetermined relation to the tape and rotameter, and means attached to the case and contacting the supporting surface for micrometrically adjusting the angular position of the case, tape, and rotameter about the center pin.

CUYLER L. CLARK.